(12) United States Patent
Harrison

(10) Patent No.: US 7,260,947 B1
(45) Date of Patent: Aug. 28, 2007

(54) AIR CONDITIONING SYSTEM OPERATING ON VEHICLE WASTE ENERGY

(76) Inventor: Thomas D. Harrison, 1767 E. Auburn Ridge La., Draper, UT (US) 84020

( * ) Notice: Subject to any disclaimer, the term of this patent is extended or adjusted under 35 U.S.C. 154(b) by 0 days.

(21) Appl. No.: 11/456,199

(22) Filed: Jul. 8, 2006

Related U.S. Application Data

(60) Provisional application No. 60/813,611, filed on Mar. 2, 2006.

(51) Int. Cl.
*F25B 27/00* (2006.01)
(52) U.S. Cl. .............. 62/115; 62/233; 62/239; 60/706
(58) Field of Classification Search ............ 62/133, 62/134, 208–209, 236, 239–244; 123/198 C, 123/197.1; 60/698, 706; 477/5, 6
See application file for complete search history.

(56) References Cited

U.S. PATENT DOCUMENTS

| | | | |
|---|---|---|---|
| 3,186,184 A | 6/1965 | Pruitt | |
| 3,459,006 A | 8/1969 | Hoyer | |
| 3,977,650 A * | 8/1976 | Berggren ............... | 251/129.01 |
| 4,425,765 A * | 1/1984 | Fukushima et al. .......... | 62/133 |
| 4,590,767 A * | 5/1986 | Gardner, Jr. ................ | 60/668 |
| 4,596,121 A | 6/1986 | Ogata | |
| 4,733,540 A | 3/1988 | Sakurai | |
| 4,753,078 A * | 6/1988 | Gardner, Jr. ................ | 60/668 |
| 5,983,650 A | 11/1999 | Ando et al. | |
| 6,251,044 B1 | 6/2001 | Streib | |
| 6,586,186 B2 * | 7/2003 | Lipshutz et al. ............... | 435/6 |
| 6,840,055 B2 * | 1/2005 | Iritani ......................... | 62/230 |
| 7,017,360 B2 * | 3/2006 | Kotwicki et al. ............. | 62/133 |
| 7,096,680 B2 * | 8/2006 | Sugesawa et al. ............ | 62/133 |
| 7,100,383 B2 * | 9/2006 | Sugesawa et al. ............ | 62/133 |
| 7,143,596 B2 * | 12/2006 | Yonekura et al. ............. | 62/236 |
| 7,146,960 B2 * | 12/2006 | Phlips et al. ............. | 123/179.4 |
| 2003/0213252 A1 | 11/2003 | Kuribayashi | |
| 2004/0079098 A1 | 4/2004 | Uno et al. | |
| 2004/0168454 A1 * | 9/2004 | Iritani ........................ | 62/230 |
| 2005/0044873 A1 * | 3/2005 | Tamai et al. ............... | 62/323.1 |

OTHER PUBLICATIONS

BMW at the Mondial de l'Automobile Paris 2006 [online] Oct. 2006 [retrieved on Nov. 13, 2006]; 4 pgs.; Retrieved from the Internet: URL: http://www.automotoportal.com/article/bmw-at-the-mondial-de-lautomobile-paris-2006.
BMW EfficientDynamics [online] Sep. 19, 2006 [retrieved on Nov. 13, 2006]; 10 pgs.; Retrieved from the Internet: URL: http://www.worldcarfans.com/news.cfm/newsID/2050919.006/page/1/country/gcf/lang/eng/bmw/bmw-efficientdynamics.
BMW Biturbo Petrol Inline Six Engine In Depth [online] Apr. 26, 2006 [retrieved on Nov. 13, 2006]; 26 pgs.; Retrieved from the Internet: URL: http://www.worldcarfans.com/news.cfm/newsID/2060426.001/page/1/country/gcf/lang/eng/bmw/bmw-3.0-litre-engine-in-depth.

\* cited by examiner

*Primary Examiner*—William E. Tapolcai
(74) *Attorney, Agent, or Firm*—Workman Nydegger

(57) ABSTRACT

A waste energy-based vehicle air conditioning system includes efficient compression driving means coupled to refrigeration means. In one implementation, the compression driving means includes a controller (e.g., magnetic clutch) that couples mechanical waste energy from an engine fan axle, a vehicle drive shaft, or a transmission shaft to an axle of a refrigerant compressor. Alternatively, the controller can also include a battery that is charged from the mechanical waste energy. Upon detecting certain pressure values, the controller powers the refrigerant compressor with a rotating axle (e.g., during deceleration) or with battery power, as appropriate. In one implementation, the controller is configured to engage compression immediately upon detecting that the vehicle is decelerating. One or more kits can be used to retrofit existing vehicles to operate the respective air conditioning systems principally on waste energy.

19 Claims, 6 Drawing Sheets

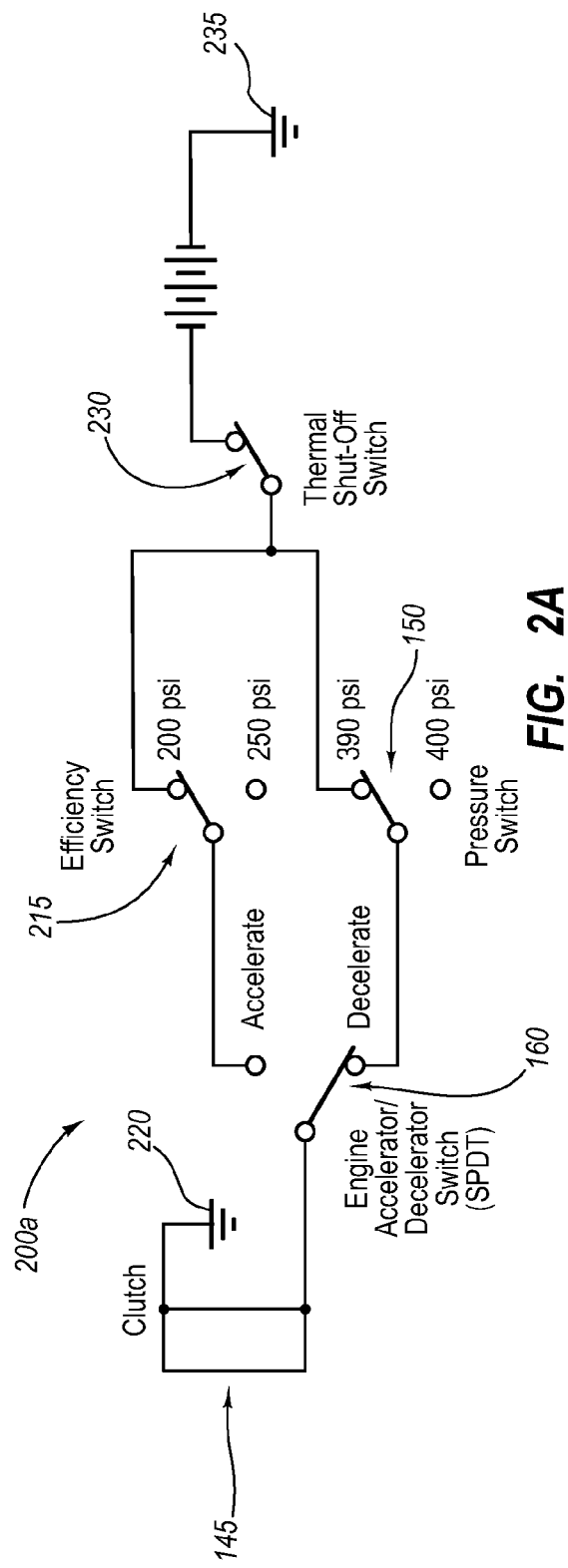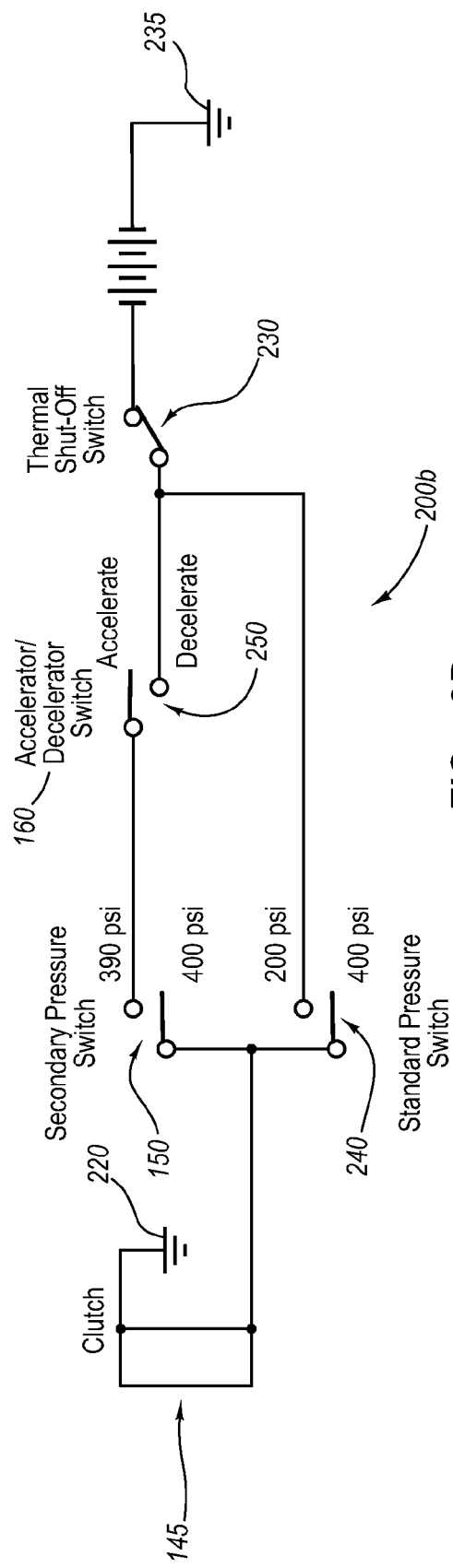
FIG. 2A
FIG. 2B

AIR CONDITIONING SYSTEM OPERATING ON VEHICLE WASTE ENERGY

CROSS-REFERENCE TO RELATED APPLICATIONS

The present invention claims the benefit of priority to U.S. Provisional Patent Application No. 60/813,611, filed on Mar. 2, 2006, entitled "Air Conditioning System," the entire contents of which are incorporated by reference herein.

BACKGROUND OF THE INVENTION

1. The Field of the Invention

Implementations of the present invention relate in part to air conditioning systems, such as used in automobiles.

2. Background and Relevant Art

For the past several decades, air conditioning systems have been used in automobiles and other motor vehicles during hot weather to provide more comfortable conditions for drivers and other vehicle occupants. Typically, an air conditioning system uses a refrigerant, which it compresses and expands at various points to cool warm air.

In general, vehicular air conditioning systems use energy from an active power source, such as an operating vehicle engine, to compress air conditioner refrigerant. One conventional air conditioner system, for example, might be configured with an air conditioner refrigerant compressor ("compressor") that is selectively coupled to a vehicle engine. In particular, the compressor might be selectively coupled to an engine fan belt, via a magnetic clutch and engine fan pulley system. When an operator engages the air conditioner, therefore, the air conditioning system engages the magnetic clutch, which then couples the air conditioner compressor to the engine (i.e., through the engine fan and engine fan pulley), and translates engine power to the compressor. The compressor of the air conditioning system can then use this engine power to compress the refrigerant.

Once compressed, conventional air conditioning systems pass the refrigerant ultimately to an expansion valve (or orifice tube) in an air box heat exchanger/evaporator ("heat exchanger") where the refrigerant may pass through a counter-current heat exchange with incoming air. Conventional air conditioning systems then pass the at least semi-condensed/compressed refrigerant from the heat exchanger back to the compressor for re-compression. Accordingly, the compressed refrigerant passes into the air box heat exchanger from the "high pressure side" of the air conditioning system, while the expanded refrigerant exits the heat exchanger into what is termed the "low pressure side" of the air conditioning system.

In general, and without use of the compressor, the exchange of differentially pressurized refrigerant volumes between the higher and lower pressure sides of the air conditioning system through the expansion valve will tend to equalize the overall refrigerant pressurization in the air conditioning system. That is, the pressure of refrigerant in the lower pressure side of the air conditioning system tends to increase with increased refrigerant volume, as well as with the addition of heat. Simultaneously, the pressure on the high pressure side of the air conditioning system tends to decrease as pressurized refrigerant passes into the heat exchanger. Ultimately, therefore, the air conditioning system will need to re-pressurize the refrigerant for it to be useful for cooling purposes.

Determining when to re-pressurize (i.e., "compress") the refrigerant is typically done any number of ways. In one conventional example, an air conditioning system might use a high/low pressure switch to monitor the refrigerant pressurization on the high and/or low pressure sides. For example, if the air conditioning system detects that refrigerant pressurization on the low pressure side is above a desired threshold, the air conditioning system might thus deduce that pressure on the high pressure side of the air conditioning system is too low, and thus engage the magnetic clutch (i.e., and engage the compressor). The air conditioning system can then compress the lower-pressure refrigerant in the low pressure side, and pass the newly-compressed refrigerant to the high pressure side. Once the pressurization on the low and/or high side of the air conditioning system hits a particular threshold, the air conditioning system might then disengage the magnetic clutch, and stop the compressor.

Although the air conditioning system might only engage the compressor at select pressure thresholds, each engagement nevertheless applies a particular load on the active power source (i.e., the engine). Although this added load on the engine may appear to be comparatively low, each added load on the power source/engine results in a need to consume additional fuel. In some situations, for example, operation of the compressor can reduce overall vehicle fuel efficiency (e.g., mpg/kpl) by as much as 25 percent or more. This simply means that a vehicle will typically consume more fuel during warmer periods (e.g., when using the air conditioner), which of course adds financial costs of additional fuel purchases. This also means that operating an air conditioner can ultimately result in additional fossil fuel exhaust expelled into the environment.

Manufacturers of hybrid vehicles (i.e., engine and battery-powered hybrids) attempt to circumvent some of these engine load/fuel efficiency problems with vehicles that use large-capacity batteries together with regenerative brakes. Such hybrid vehicles couple charging of the large-capacity battery at least in part to waste kinetic energy generated only during braking actions (using dynamic brakes, which charge the battery). The additional costs associated with the larger battery, the complex mechanisms used by the hybrid vehicle to capture waste energy, and the extra weight added thereby, however, tend to make conventional hybrid vehicles fairly expensive. These complex mechanisms also tend to be expensive to maintain over time, and such costs could tend to offset some of the savings associated with the added fuel economy.

BRIEF SUMMARY OF THE INVENTION

Implementations of the present invention solve one or more problems in the art with systems, apparatus, and methods configured to mitigate fuel economy issues associated with using air conditioning systems in conventional vehicles. In particular, implementations of the present invention include readily-addable, low-cost components configured to coincide or constrain compressor (e.g., of air conditioning systems) operations principally with the presence of passive energy sources (i.e., vehicle waste mechanical kinetic energy—"waste energy"), and independent of braking actions. In one implementation, an air conditioning system can also be configured to use multiple sources of passive energy (i.e., "dual source" operations). As such, a vehicle air conditioning system can be easily and inexpensively configured to minimize loads on active energy sources (e.g., the engine) during air conditioner operation.

For example, a vehicle air conditioning system that is configured to compress refrigerant with mechanical waste energy in accordance with an implementation of the present invention can include refrigeration means. In general, the refrigeration means will include at least a compressor configured to pressurize refrigerant. In addition, the vehicle air conditioning system can include compression driving means configured to drive the refrigeration means at least in part upon detecting mechanical waste energy. In particular, the compression driving means will be configured so that compressor operation coincides with, and is operated by, the detected mechanical waste energy.

By contrast, a method in accordance with an implementation of the present invention of compressing refrigerant with minimal engine load by compressing the refrigerant primarily with vehicle waste energy can involve identifying that the vehicle's engine is decelerating. The method can also involve powering a refrigerant compressor and a self-charging motor with a rotating axle. In such a case, the refrigerant is compressed and a battery is charged with mechanical waste energy during times of vehicle deceleration. In addition, the method can involve compressing the refrigerant in a refrigerant compressor with the rotating axle, or with battery power, upon identifying that the refrigerant has reached a minimum pressure value.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A illustrates a schematic diagram in accordance with an implementation of the present invention of an electrical circuit configured to engage refrigerant compression in response to detected low refrigerant pressure values and/or to detected waste energy;

FIG. 2B illustrates a schematic diagram in accordance with an implementation of the present invention representing potential after-market modifications to an existing air conditioning system circuitry to thereby enable compression in response to detected waste energy;

DETAILED DESCRIPTION OF THE PREFERRED EMBODIMENTS

Implementations of the present invention extend to systems, apparatus, and methods configured to mitigate fuel economy issues associated with using air conditioning systems in conventional vehicles. In particular, implementations of the present invention include readily-addable, low-cost components configured to coincide or constrain compressor (e.g., of air conditioning systems) operations principally with the presence of passive energy sources (i.e., vehicle waste mechanical kinetic energy—"waste energy"), and independent of braking actions. In one implementation, an air conditioning system can also be configured to use multiple sources of passive energy (i.e., "dual source" operations). As such, a vehicle air conditioning system can be easily and inexpensively configured to minimize loads on active energy sources (e.g., the engine) during air conditioner operation.

As will be appreciated more fully herein, the principles described herein can be performed with a number of relatively simple (and relatively low-cost) components, both mechanical and electrical. For example, implementations of the present invention include a number of mechanical components for coupling refrigerant compressor or air brake compressor (e.g., of a truck or bus) operations to moving components of a vehicle. In addition, implementations of the present invention include a number of electrical components for driving or operating the various mechanical components, including electrical detectors, electrical switches, microprocessors, motors, batteries (e.g., for dual source operations), and the like. Furthermore, implementations of the present invention provide after-market kits comprising these and other components that can be used to easily retrofit existing vehicle air conditioning systems for the use of waste energy when engaging compression/re-charging functions.

Figure 1A:
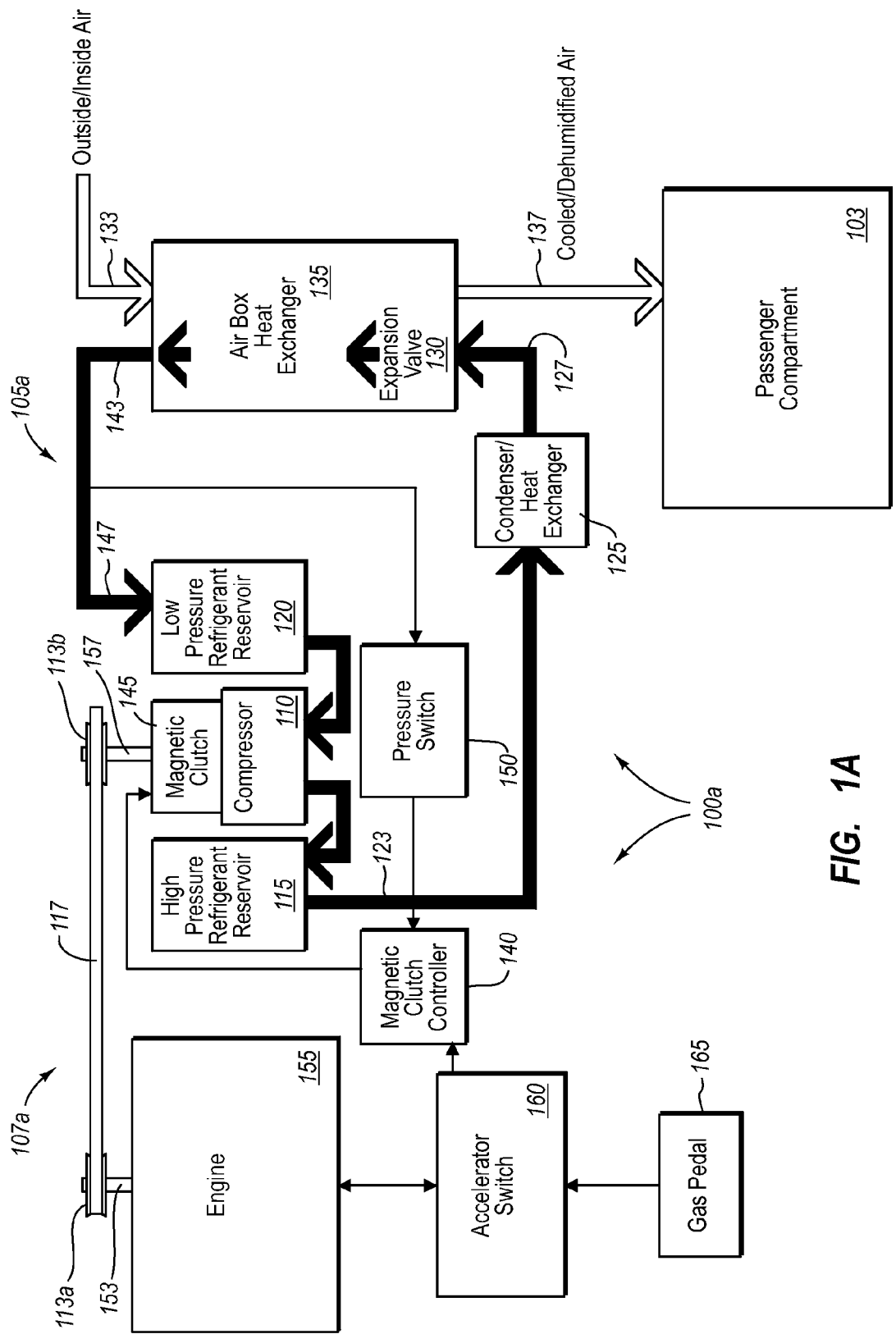
FIG. 1A illustrates an overview schematic diagram in accordance with an implementation of the present invention of a single source air conditioning system configured to compress refrigerant with waste energy.

FIG. 1A illustrates an overview schematic diagram in accordance with an implementation of the present invention of a "single mode" air conditioning system 100a configured to primarily engage passive (e.g., "waste") energy sources (e.g., a decelerating axle) in order to compress refrigerant. As shown, air conditioning system 100a generally comprises a refrigeration means 105a that includes a number of components configured to exchange energy between warm air and cool, expanded refrigerant, and pass the ultimately cooled incoming air to passenger compartment 103. For example, FIG. 1A shows that refrigeration means 105a comprises compressor 110, which, in turn, is coupled to high pressure refrigerant reservoir 115, and to low pressure refrigerant reservoir 120.

As implied by their names, the refrigerant in refrigerant high pressure reservoir 115 will generally be in a state of greater compression than that in low pressure refrigerant reservoir 120. The specific refrigerant pressure(s) in reservoirs 115 and 120, however, can vary from one operating environment to the next. Furthermore, the specific type of refrigerant can also vary from one implementation to the next. For example, a manufacturer can select any refrigerant, such as one designed to cool when expanded, including such commonly known refrigerants as "FREON," R-12, and/or R-134.

In any event, FIG. 1A also shows that refrigeration means 105a comprises a condenser/heat exchanger 125. Generally, refrigerant exits refrigerant reservoir 115 at a point 123, and enters condenser/heat exchanger 125. For example, air conditioning system 100a can direct recently-compressed refrigerant from reservoir 115 to condenser/heat exchanger 125 via point 123. Condenser/heat exchanger 125, in turn, reduces the temperature of the compressed refrigerant.

FIG. 1A also shows that air conditioning system 100a directs the refrigerant from condenser/heat exchanger 125 to air box heat exchanger 135, such as at point 127. Air box heat exchanger 135, in turn, is generally configured with any number of components to exploit an effective temperature sink between incoming air 133 and refrigerant. For example, air box heat exchanger 135 comprises any number of components configured to facilitate countercurrent heat exchange between the relatively hot incoming air 133 and the relatively cool refrigerant. In at least one implementation, heat exchanger 135 includes, for example, a plurality of coils, tubing, or other known heat exchange components, and further includes refrigerant expansion valve 130 (or orifice tube).

In at least one implementation, expansion valve 130 is configured to cause the refrigerant to expand into a relaxed state. Specifically, the type of refrigerant chosen is such that the relaxed state is also a much cooler state than when the refrigerant is compressed. In particular, the temperature of the expanded refrigerant is significantly lower than the temperature of incoming air 133, whether drawn from the external environment of the motor vehicle, and, in some cases, whether drawn from within passenger compartment 103. This difference in temperature between incoming air 133 and the expanded refrigerant effectively creates a heat sink on the expanded refrigerant side. This heat sink on the expanded refrigerant side ultimately provides the cooling functionality of air conditioning system 100a.

In particular, air box heat exchanger 135 provides a temperature gradient for both the incoming air and for the expanded refrigerant as each passes through in opposite directions. For example, as incoming air 133 enters heat exchanger 135, the air first comes in contact with the expanded refrigerant that has been cooled since it first entered expansion valve 130. As such, the incoming air experiences at least some heat transfer at its entry point, and further experiences additional heat transfers as it encounters cooler refrigerant along the remainder of heat exchanger 135. As a result, the incoming air at point 137 is in a much cooler state than when it entered air box heat exchanger 135. Similarly, the expanded refrigerant at point 143 is at a higher temperature state than when first exiting expansion valve 130.

Upon exiting air box heat exchanger 135, the air conditioning system 100a directs refrigerant from point 143 to point 147, and ultimately into low pressure reservoir 120. In general, points 143 and 147 will be understood herein to represent the "low pressure side" of system 100a (or of the refrigeration means), since the refrigerant compression/pressurization of the refrigerant at these points is generally lower than that at points 123 and 127. The converse, of course, is that points 123 and 127 will be understood herein to represent the "high pressure side" of system 100a (or of the refrigeration means).

Notwithstanding these generalized representations and/or designations, one will appreciate that the pressurization of the refrigerant within system 100a (as well as 100b, 400, etc.) can cycle from high to low on any given low or high pressure side. For example, as the expanded refrigerant passes points 143 and 147 (i.e., the "lower pressure side" of system 100a) and gathers in low pressure reservoir 120, the pressure within low pressure reservoir 120 will increase. Similarly, as air conditioning system 100a directs the compressed refrigerant out of high pressure reservoir 115, its volume decreases in this reservoir, and ultimately so does its pressurization level.

Accordingly, air conditioning system 100a can measure the low or high pressure sides to determine whether to turn on the compressor to compress the refrigerant. For example, FIG. 1A shows an implementation in which air conditioning system 100a includes compression driving means 107a for appropriately coupling energy sources to the refrigeration means 105a. In particular, FIG. 1A shows that driving means 107a includes a controller (e.g., magnetic clutch controller 140), which, in turn, is coupled to pressure switch 150. FIG. 1A also shows that pressure switch 150 is connected in this case to the low pressure side (143, 147) of refrigeration means 105. In one implementation, pressure switch 150 is configured to open or close a connection with magnetic clutch controller 140 based on pressure values (or pass pressure values thereto). The controller 140 (also referred to as "magnetic clutch controller 140"), in turn, can engage refrigerant compression functions based in part on what is detected by pressure switch 150.

For example, magnetic clutch controller 140 could identify from pressure switch 150 (e.g., via opening or closing of a switch) that pressure on the low pressure side of refrigeration means is too high, and thus that compressor 110 needs to be started. In one exemplary operation, this can involve magnetic clutch controller 140 opening a connection (or sending one or more electronic signals thereto) with magnetic clutch 145, which thus engages magnetic clutch 145. Of course, magnetic clutch controller 140 could also be configured with microprocessors and software designed to make these determinations based on a combination of data points received from pressure switch 150 (i.e., rather than the opening or closing of a specific switch).

In one implementation, therefore, compression driving means 107a-c can include "engagement means," which comprise one or more "engagement components," such as at least controller 140 and clutch 145 (or the like). In addition, the compression driving means 107a-c can also include a "pressurization system," which comprises engagement means, and further comprises electronic means (e.g., switches, detectors, processors, electronic storage, circuitry, etc.) for engaging refrigerant pressurization through the engagement means.

In any event, when magnetic clutch 145 engages, magnetic clutch 145 harnesses pulley 113b, which is rotating due to coupling with an engine fan (not shown) axle/shaft 153 of engine 155 via pulley 113*a* and belt 117 (e.g., a notched belt). This engagement further causes axle 157 within compressor 110 to rotate. Rotation of axle 157 further provides compressor 110 energy, which compressor 110 can translate to compress the refrigerant from its pressurization value in the low pressure reservoir 120 to its pressurization value in the high pressure reservoir 115. Conversely, and by reverse mechanisms, magnetic clutch controller 140 can also be configured to stop compression by, for example, disengaging magnetic clutch 145. For example, magnetic clutch controller 140 might identify (e.g., via pressure switch 150) that the refrigerant pressurization has reached a lower threshold value (or that the high pressure side has reached a maximum high pressure value).

As previously mentioned, air conditioning system 100*a* can further be configured so that refrigerant compression functions occur during deceleration periods (as well, in some cases, in response to certain refrigerant pressure thresholds, discussed hereinafter). For example, air conditioning system 100*a* can be configured to engage and translate power from engine 155 when determining that the vehicle is presently decelerating. Accordingly, FIG. 1A shows at least one way of detecting deceleration using, for example, accelerator switch 160. In particular, FIG. 1A shows an implementation in which magnetic clutch controller 140 is coupled to accelerator switch 160, which, in turn, is coupled to a vehicle gas pedal 165.

In such an implementation, magnetic clutch controller 140 can be configured to determine deceleration by identifying information from accelerator switch 160. For example, accelerator switch 160 identifies when there has been a release from gas pedal 165, and sends this information in the form of electronic instructions to magnetic clutch controller 140. Alternatively, this detection by accelerator switch 160 opens or closes an electronic switch in an electrical connection with magnetic clutch controller 145. The reverse could be true when accelerator switch 160 detects added pressure to gas pedal 165 to stop compressor action. In one implementation, therefore, "deceleration" is defined herein as a state of reduction in fuel sent to the engine, a reduction of power output from the engine, or a state of no acceleration, based on fluctuations on gas pedal 165.

In alternative or additional implementations, "deceleration" can also or alternatively be based on any number of other detected values or actions. For example, magnetic clutch controller 140 can be configured to identify deceleration when the vehicle drive shaft torque is in the opposite direction compared with its direction during acceleration (i.e., detecting "reverse torque.") Magnetic clutch controller 140 can also be configured in some cases to determine deceleration periods when detecting application of vehicle brakes (e.g., via coupling of brakes with accelerator switch 160 or a brake switch—not shown). Magnetic clutch controller 140 can still further be configured to identify deceleration when engine 155 is no longer powering any vehicle movement at all, such as when the vehicle is moving downhill primarily in response to gravity and momentum. Magnetic clutch controller 140 can yet still further be configured to identify deceleration through the use of an axial accelerometer (not shown) that shows negative acceleration. In such a case, the vehicle could even be accelerating (e.g., downhill) even though the engine itself is actually decelerating, or providing no torque at all.

In one method of operation, therefore, a user begins to drive and fluctuate gas pedal 165 for various acceleration and driving speed requirements. When the user releases the gas pedal even momentarily, compression driving means 107*a* of air conditioning system 100*a* detects deceleration and immediately engages refrigeration means 105 to compress refrigerant. Specifically, magnetic clutch 145 immediately engages the engine fan axle (via pulleys 113*a-b* and belt 117), which is still rotating albeit at a decelerating rate since no engine power is being applied (or decreasingly applied). This engagement, in turn, causes compressor 110 to engage axle 157, which provides direct rotational energy that can be translated to compress refrigerant in reservoir 120.

Since the air conditioning system 100*a* immediately (or almost immediately) begins compressing refrigerant in response to release from gas pedal 165 (or other appropriate deceleration determinations), refrigerant pressurization will generally remain above a useful operating threshold. This generally tends to be the case since the refrigerant pressure will have been recharged in bits and pieces in response to the driver's use of the gas pedal, such as during city driving. One will appreciate, nevertheless, that, with some vehicles, refrigerant pressure may still reach a sub-optimal value during extended periods of constant speed (where little if any deceleration is detected). For example, a driver may maintain fuel input to the engine at a relatively constant rate (e.g., hold the gas pedal at a constant pressure/level, maintain a "cruise control" speed value, etc.)

Accordingly, a "single-source" (i.e., single waste energy-source) air conditioning system 100*a* operating in accordance with implementations of the present invention can still compress refrigerant using engine 155. In particular, air conditioning system 100*a* can simply engage engine 155 power (as done conventionally) when detecting that refrigerant pressure is too low and/or when there is no detected waste energy. In one implementation, therefore, air conditioning system 100*a* can ensure that refrigerant is always compressed to at least a minimum value for operating the vehicle air conditioning system effectively, even though primarily using waste energy to compress refrigerant.

Figure 1B:
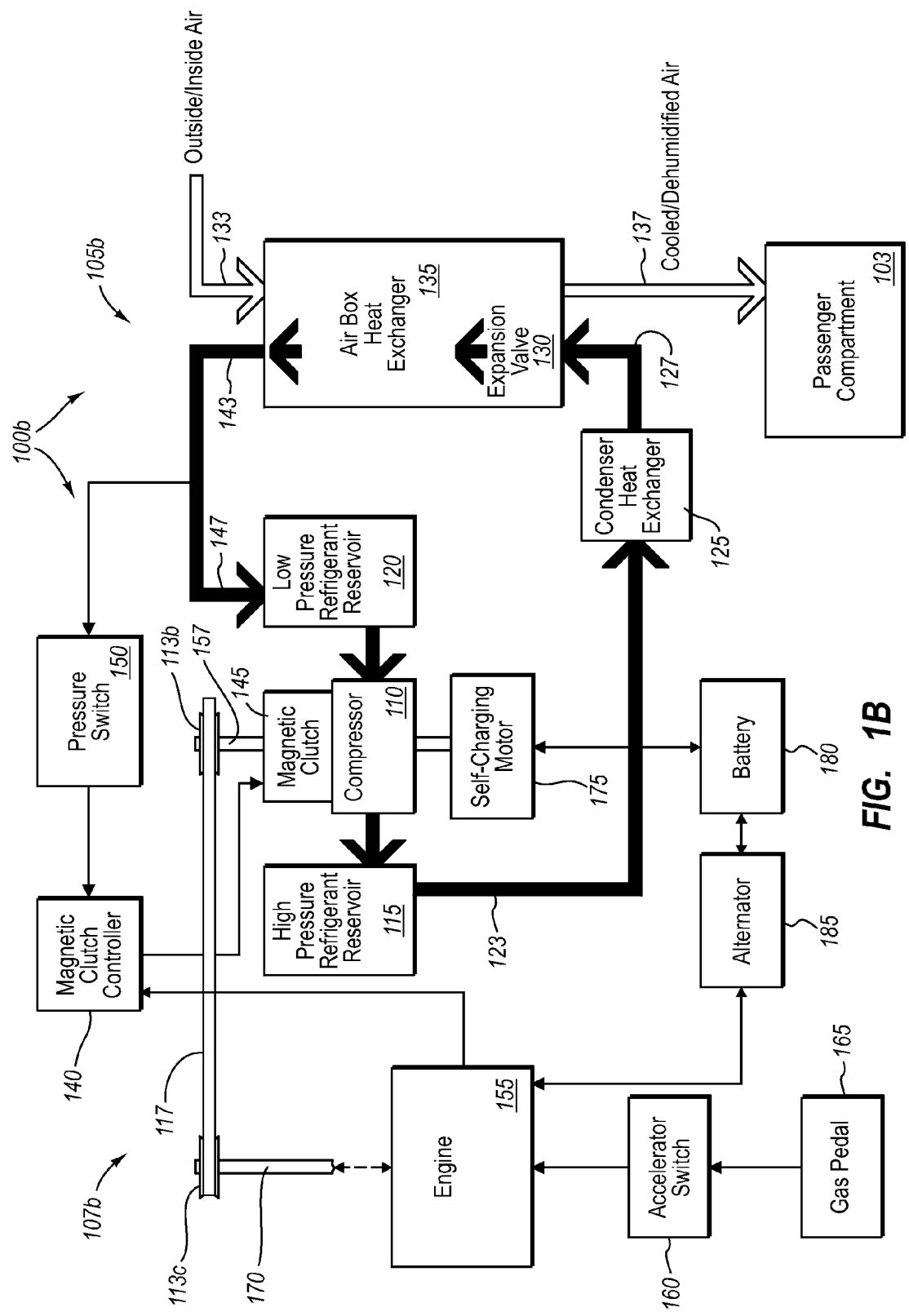
FIG. 1B illustrates an overview schematic diagram in accordance with an implementation of the present invention of a dual-source air conditioning system configured to compress refrigerant, and to further charge battery power.

By contrast, a "dual-source" air conditioning system 100*b* in accordance with implementations of the present invention comprises two or more passive energy sources (or sources of mechanical waste energy) that can be used to compress refrigerant without directly harnessing active engine 155 power. For example, FIG. 1B illustrates an implementation in which compression driving means 107*b* is configured to use waste mechanical energy not only to drive refrigeration means 105*b*, but also to drive battery charging apparatus. In particular, FIG. 1B shows that both compressor 110 and self-charging motor 175 can both be coupled to axle 157. Thus, when magnetic clutch controller 140 engages magnetic clutch 145 (e.g., during deceleration), compressor 110 and self-charging motor 175 can both translate energy from rotating axle 157 (i.e., when the vehicle is in motion).

In addition to compressing refrigerant, this coupling with rotating axle 157 allows self-charging motor 175 to charge a battery (e.g., 180). One will appreciate that such coupling can provide the principal vehicle battery power (and/or additional sources for charging a battery) compared with what a conventional vehicle alternator might provide, without necessarily incurring added fuel costs to recharge the battery. While this can be especially the case where a separate battery is used, such a configuration can still provide fuel savings (equal in most cases) when using the same battery (e.g., 180) since only one of the two or more recharging sources (e.g., self-charging motor 175 and vehicle alternator 185) relies on active engine 155 power (i.e., alternator 185).

One will also appreciate that the charging of a battery (e.g., 180) can also be done in a "dual-mode" manner. For example, if compressor 110 operation depletes the charge of battery 180 to a critically low threshold value, magnetic clutch controller 140 can simply engage magnetic clutch 145 again, so that self-charging motor 175 recharges the battery using engine 155 power. Where the air conditioning system is not in operation, the vehicle may be configured to recharge the battery with alternator 185 as needed. As a result, and as similarly described with respect to dual-mode air conditioning systems described herein, a vehicle can also be configured so that it charges its battery(ies) during air conditioner operation primarily with mechanical waste energy, and only resorts to engine 155 power within certain upper or lower battery charge thresholds.

In any event, one will appreciate that this additional, available battery power can Abe used for a wide variety of other functions. For example, if little deceleration has been detected (e.g., constant driving speeds, during vehicle stoppage, or if the engine has been turned off) and refrigerant pressure drops to too low of a value, self-charging motor 175 can simply reverse its electric field and operate compressor 110 on battery power. One will appreciate in at least some cases, therefore, that the vehicle air conditioning system can thus operate for longer periods of time at constant driving speeds (little or no deceleration detected) without using engine 155 to compress refrigerant. Furthermore, this also means that the vehicle can operate air conditioning system 100b for a much longer time than previously available without engaging engine 155 power when the vehicle is stopped, and/or the engine has been turned off.

In addition to the foregoing, FIG. 1B also illustrates an implementation in which compression driving means 107b can be configured to harness waste energy only indirectly from engine 155. This contrasts with other implementations in which compression driving means 107b directly harness power from engine 155, such as, for example, being directly coupled to the engine fan axle. For example, FIG. 1B shows that pulley 113b can be alternatively coupled via belt 117 to different pulley 113c, which, in turn, is connected to axle 170. In general, axle 170 will include any type of vehicle axle that is directly connected to the vehicle driving wheels without passing through any torque converter, or other slippage devices, and continues to rotate after engine 155 has stopped providing force or torque. For example, a vehicle drive shaft or transmission shaft will continue to rotate during deceleration, or downhill travel, even though the rotation of the engine fan axle (e.g., 153) is decelerating, or is not rotating at all.

Accordingly, axle 170 can include a vehicle drive shaft, or can include a transmission shaft, such as one typically located between the vehicle drive shaft and a transmission fluid coupling or torque converter. This can also allow direct and efficient translation of vehicle waste kinetic energy through the vehicle's tires, which can be particularly helpful since such translation of waste energy can occur without any transmission slippage losses at all. Similar to FIG. 1A, therefore, magnetic clutch controller 140 can engage magnetic clutch 145 during deceleration. Rather than engaging engine 155 directly, however, magnetic clutch 145 immediately engages drive (or transmission) shaft 170. During deceleration, the energy received from the still rotating drive shaft 170 (albeit decelerating) can be translated to power compressor 110, and thus pressurize refrigerant.

FIGS. 2A and 2B illustrate exemplary electronic schematics of pressure switches (e.g., 150) and accelerator/decelerator switches that can be used to accomplish both the single and/or dual source functions described with respect to FIGS. 1A and 1B. In particular, FIG. 2A illustrates a schematic diagram of an electronic circuit 200a, which shows an electronic connection between magnetic clutch 145 and accelerator switch 160. In one implementation, accelerator switch 160 (as well as any of the other switches described herein) can comprise a Single Pole, Double Throw ("SPDT") switch, which provides alternating contact between two contacts, such as an accelerate contact and a decelerate contact.

For example, accelerator switch 160 can be configured to contact the accelerate contact when engine 155 is accelerating; while, when engine 155 is decelerating, accelerator switch 160 would contact the decelerate contact. As previously mentioned, this toggling between accelerate/decelerate contacts can occur in response to a wide range of detectable acceleration/deceleration events, including detections of changes in drive shaft torque, or the like.

In addition, FIG. 2A shows that electronic circuit 200a comprises an efficiency switch 215 that can only be traversed when accelerator switch 160 is toggled to an accelerate contact. Efficiency switch 215, in turn, can be configured so that it only closes the electrical connection when refrigerant pressure (as determined from high or low pressure side calculations) in air conditioning system 100a is outside of a preset or required, enveloped value (e.g., minimum high pressure side value, maximum low pressure side value). In the illustrated example, therefore, efficiency switch 215 is configured to close when the refrigerant pressurization is less than an exemplary pressure of about 200 psi. By contrast, FIG. 2A shows that efficiency switch can open when the refrigerant pressure exceeds an exemplary pressure of about 250 psi, which, of course, does not allow for further compressor 110 engagement and resultant refrigerant pressurization. Thus, efficiency switch 215 can ensure that engine 155 power is used to operate compressor 110 only in relatively limited cases.

FIG. 2A also shows that electronic circuit 200a can be configured with similar logic on the deceleration side, albeit configured to ensure that compressor engagement occurs at virtually any refrigerant pressure below a certain maximum value for system designs. As shown, for example, electronic circuit 200a on the deceleration side includes pressure switch 150, which is configured to close at pressures lower than an exemplary (and relatively high) threshold value of about 390 psi. Setting the switch to close at this high of a value virtually ensures that pressure switch 150 will remain closed in most cases, almost by default. In addition, FIG. 2A shows that pressure switch 150 opens at pressures greater than the exemplary upper value of about 400 psi. Accordingly, despite being closed virtually by default, electrical circuit 200a can still prevent magnetic clutch 145 from engaging and causing pressurization of refrigerant beyond system limits (e.g., about 400 psi in this exemplary case.)

In addition to the above-described efficiency switch 215 and pressure switch 225, FIG. 2A also shows that electronic circuit 200a can further include a thermal shut-off switch 230. In general, thermal shut-off switch 230 ensures that there is no clutch 145 engagement when engine 155 (or other relevant motor vehicle component) is overheating, or approaching a high temperature design limit. In addition, FIG. 2A shows that electrical circuit 200a can comprise grounds 220 and 235. In general, ground 220 connects with magnetic clutch 145, and ground 235 connects with thermal switch 230; and both grounds 220, 235 are configured to maintain a safe electrical connection with system components.

FIG. 2B illustrates a schematic overview of alternate electronic circuit 200b, such as may be used to modify a conventional air conditioning system to utilize vehicle waste energy to operate the compressor. In this example, pressure switch 240 and thermal shut-off switch 230a can represent pre-existing components of a standard, vehicle air conditioning system. By contrast, secondary pressure switch 150 and accelerator switch 160 represent in this case after-market components that a user can add to the standard air conditioning system.

In the illustrated embodiment, conventional pressure switch 240 can be configured to actuate magnetic clutch 145 only when the refrigerant pressurization is less than an exemplary minimum threshold value of 200 psi. For example, FIG. 2B shows that pressure switch 240 is configured to close (and engage magnetic clutch 145) only when the refrigerant pressurization is detected to be at or below about 200 psi. By contrast, after-market secondary pressure switch 150 is configured to stay closed in almost all cases, except at relatively high upper threshold pressures of about 390 to about 400 psi. As such, after-market secondary pressure switch 150 can provide a bypass to the generally-open pressure switch 240. Furthermore, both secondary switch 150 and standard switch 240 will be closed at pressures at or below the exemplary minimum threshold of about 200 psi.

Accordingly, FIG. 2B also shows that electrical circuit 200b can further comprise after-market accelerator switch 160. FIG. 2B shows that accelerator switch 160 can be configured to close only when detecting deceleration (e.g., the driver's foot is not depressing gas pedal 165). Furthermore, accelerator switch 160 is positioned so that it does not impede an electrical pass-through from pressure switch 240. Thus, if pressure switch 240 is engaged at any time (e.g., a critically low refrigerant pressures), magnetic clutch 145 can be engaged regardless of acceleration or deceleration events. By contrast, accelerator switch 160 is configured to impede electrical pass-through from after-market pressure switch 150, so that magnetic clutch 145 takes advantage of waste energy at pressures between about 200 psi and 390 psi (i.e., by engaging only during detected deceleration).

As with electrical circuit 200a, electrical circuit 200b is also configured to maximize the range for which magnetic clutch 145 uses waste energy to pressurize refrigerant, and further to minimize the range for which magnetic clutch 145 uses engine power to pressurize refrigerant. Accordingly, one will appreciate that the schematics of FIGS. 1A through 2B illustrate a number of components and configurations (both general and specific) that can be used to incorporate waste energy from single waste energy-source (i.e., mechanical waste energy only) or dual waste energy-source (i.e., mechanical waste energy, or waste-energy-generated battery power) perspectives.

Figure 3A:
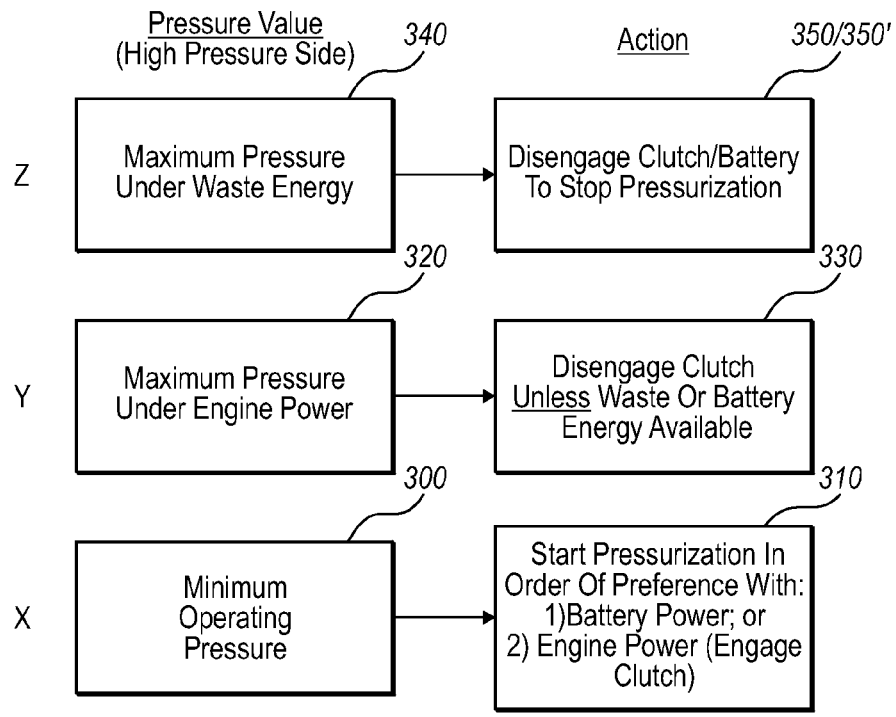
FIG. 3A illustrates a set of pressure values and response actions in accordance with an implementation of the present invention for operating an air conditioning system with single and dual-source functionality.
Figure 3B:
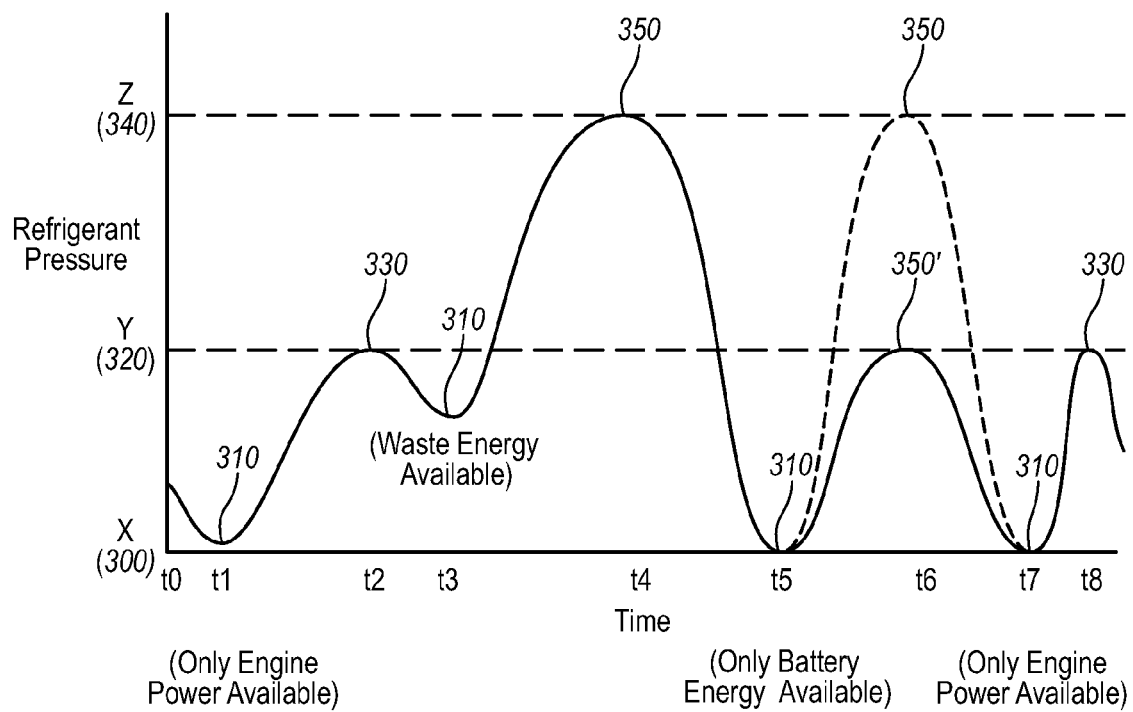
FIG. 3B illustrates a graph of refrigerant pressure versus time during one instance of operation in accordance with an implementation of the present invention.

FIGS. 3A and 3B describe sets of triggers and corresponding actions that can be taken in response thereto, as well as a pressurization plot graph of one example instance of operation. As shown in FIG. 3A, for example, a vehicle air conditioning system 100a/b (e.g., via for magnetic clutch controller 140 configured with electronic circuitry, or microprocessor(s) and computer-executable instructions) can be set to an upper maximum pressure value "Z" 340, such as a high pressure value on the high pressure side (e.g., 123, 127) of refrigeration means 105.

For example, air conditioning system 100a will engage mechanical waste energy and/or battery power sources (in dual waste energy-source configuration—or "dual source" configuration) as much as possible (and as much as available). This can help to build up a sufficient reservoir of highly-pressurized refrigerant, and thus minimize the amount of engine 155 power that might ultimately be needed. Of course, a refrigerant compressor generally cannot pressurize refrigerant indefinitely. Accordingly, and as also illustrated in FIGS. 2A-2B, the high pressure value might be set high as to about 380-410 psi. Of course, this value can also be higher or lower in other implementations, depending on the operating environment. In particular, the pressures disclosed herein in the drawings and text are only example pressures and pressure ranges. The actual pressures and/or pressure ranges in a system can vary widely.

FIG. 3A also shows that air conditioning system 100a/b can be set with an intermediate pressure value/trigger "Y" 320, which generally represents the maximum allowable amount of pressurization when using active energy sources (i.e., engine 155 power). As previously mentioned, this is referred to as "dual-mode" operation, where compressor 110 can be operated at least by one mode (i.e., an active energy source—engine 155 power) primarily within lower pressure ranges (e.g., between "X," and "Y") when insufficient passive energy is detected; and operated by a different, or second mode (i.e., a passive energy source—mechanical waste energy) at any pressure range (e.g., between "X," and "Z") any time passive energy is detected. Thus, "dual-mode" refers to the ability to use either engine power or waste energy, as available; while "dual-source" (or "dual waste energy-source") configurations refer primarily the ability to use mechanical waste energy directly (e.g., translated from a rotating axle), or indirectly (e.g., previously translated electrically from a rotating axle and stored in a battery).

For example, air conditioning system 100 may have engaged active energy sources when mechanical waste energy and/or battery power sources are unavailable (e.g., during acceleration, or constant speed) and refrigerant pressurization is too low to effectively cool incoming air 133. Nevertheless, in order to minimize the amount of active energy sources used to pressurize refrigerant, the intermediate pressure value "Y" can be set to a value sufficient to ensure the active engine 155 energy source is used sparingly. Accordingly, and as illustrated in FIGS. 2A-2B, this intermediate pressure value "Y" might be set as high (or low) as about 240-260 psi. Of course, this intermediate value can also be higher or lower in other implementations, depending on the operating environment.

In addition, FIG. 3A further shows that air conditioning system 100a can be set with a critical, low pressure value/trigger "X" 300, which generally represents the minimum allowable amount of refrigerant pressurization needed for effective operation of the air conditioning system. As described above, an extended period of air conditioner use coupled with a lack of deceleration (e.g., during freeway driving), may result in a need to engage whatever energy sources (e.g., engine 155 or possibly battery power) are available to ensure adequate refrigerant pressurization. Accordingly, and as illustrated in FIGS. 2A-2B, for example, this critical, low pressure value "X" might be set as high (or low) as about 190-210 psi. Of course, this low value can also be higher or lower in other implementations, depending on the operating environment.

Each of the values "X" 300, "Y" 320, "Z" 340, therefore, correspond to a set of actions to be performed by air conditioning system 100. For example, pressure value "X" 300 exemplifies reaching the minimum operating pressure, and results in action 310 of pressurizing refrigerant by engaging compression driving means (e.g., engaging magnetic clutch 145, or engaging battery power, as available). In addition, FIG. 3A shows that pressure value "Y" 320 represents an intermediate pressure value when using active engine 155 power to drive compression, and thus results in action 330 of stopping pressurization unless waste energy is now available. For example, engine 155 may be accelerating or at constant speed from the point at pressure value "X" 300 until reaching pressure value "Y" 320. Nevertheless, at the point of reaching value "Y," the vehicle may have begun decelerating, and, as such, waste energy would be available. If no waste energy is available, air conditioning system simply disengages magnetic clutch 145 at pressure value "Y" 340.

FIG. 3A further shows that air conditioning system 100a/b can be set with a maximum pressure value "Z" 340, which results in an action 350 (and/or 350') of stopping pressurization altogether. In accordance with at least one implementation of the present invention, such a maximum pressure value will only be reached when using mechanical waste energy (or battery power—e.g., dual mode) sources, due at least in part to the presence of intermediate value "Y" 320 and corresponding action 330. Nevertheless, the maximum pressure value "Z" 340 can ensure that compressor 110 never pressurizes refrigerant beyond system design values (when appropriately configured), regardless of the manner in which the compressor is being driven. In one implementation, action 350' (i.e., disengaging battery power) can also be triggered alternatively at lower pressure values, such as at intermediate pressure value "Y" 320, in order to save battery charge. For example, some smaller batteries may exhaust their charge relatively quickly if used to power compressor 110 for very long.

FIG. 3B, therefore, illustrates a graph of at least one exemplary operation source over time based on the values and actions set forth in FIG. 3A, and further based on the discussion of operations with respect to FIGS. 1A-2B. In particular, FIG. 3B illustrates a graph of refrigerant pressurization (e.g., on the high side) during vehicle operation using single and/or dual source functions. For example, when a user engages vehicle air conditioning system 100 at time $t_0$, and waste energy is unavailable, refrigerant pressurization begins to decline somewhat. Upon hitting pressure value "X" at time $t_1$, magnetic clutch controller 140 performs action 310. In this case, if no battery power is available (e.g., "single source' operations, or not charged), magnetic clutch controller 140 can engage magnetic clutch 145 so that engine 155 power powers compressor 110.

With engine 155 power engaged, refrigerant pressure continues to increase until it ultimately reaches intermediate pressure value "Y" at time $t_2$. This increase can be due to any engine 155 power or mechanical waste energy that is being produced by engine 155, since magnetic clutch 145 will simply remain engaged. At this intermediate pressure value, magnetic clutch controller 140 (e.g., via electronic circuitry or through software instructions) could identify a deceleration event (e.g., mechanical waste energy), and thus keep magnetic clutch 145 engaged. Alternatively, if battery power is available, magnetic clutch controller 140 could still disengage magnetic clutch 145 and engage battery power. In the illustrated example, however, magnetic clutch controller 140 fails to identify waste energy, and thus performs action 330 of disengaging magnetic clutch 145 without any engagement of another power source. Accordingly, FIG. 1B shows that refrigerant pressurization again begins to decrease.

In addition to the foregoing, magnetic clutch controller 140 can be configured to engage magnetic clutch 145 immediately at any time it detects available vehicle waste energy. As shown in FIG. 3B, for example, magnetic clutch controller 140 detects waste energy (e.g., a deceleration event) at time $t_3$, and before hitting the critical minimum pressure "X" 300. This results in corresponding action 310 of engaging magnetic clutch to pressurize refrigerant. In this particular example, there is sufficient deceleration occurring through time $t_4$ so that compressor 110 pressurizes the refrigerant to the maximum allowable pressure "Z" 340. One will appreciate that, in dual mode, this deceleration can also drive self-charging motor 175 to also charge a battery during this time.

Upon reaching the maximum pressure value "Z," magnetic clutch controller 140 performs action 350 of stopping pressurization, such as by disengaging magnetic clutch 145. Refrigerant pressurization thus begins to fall. Again, one will appreciate that refrigerant pressure could immediately rise again shortly thereafter upon detecting a new deceleration event, and after the refrigerant pressure drops below a certain maximum value (e.g., about 390 psi), which allows the compressor to engage (e.g., switch 150, FIGS. 2A/2B). Nevertheless, FIG. 3B shows that magnetic clutch controller 140 (or other controller mechanism) allows the refrigerant pressure to drop all the way to the minimum pressure value "X" at time $t_5$.

In this particular example, magnetic clutch controller 140 identifies the presence of battery power when hitting the minimum pressure value "X" at time $t_5$. As such, magnetic clutch controller 140 simply engages battery power, rather than engine 155 power, and compresses refrigerant until hitting a prescribed maximum pressure value at time $t_6$, such as value "Y" 320, or a maximum pressure value "Z" 340, however configured. For example, a manufacturer may want to allow the battery to drive compressor 110 operation to pressure value "Z" 340 when using larger batteries in some vehicles.

As previously mentioned with smaller batteries, however, the manufacturer may want to limit battery power to pressure value "Y" 320, similar to how engine 155 can be limited. Hence, FIG. 3B shows a dotted line between times $t_5$ and $t_7$, which indicates at least one alternate battery engagement/disengagement configuration. In any event, and depending on the maximum pressure prescribed for the battery usage, magnetic clutch controller 140 disengages the battery power when hitting the prescribed maximum. For example, magnetic clutch controller 140 can perform action 350 or 350' and stop compressing refrigerant with the battery.

In addition, since no mechanical waste energy (or sufficient battery power) is detected through time $t_7$, magnetic clutch controller 140 allows the refrigerant pressurization to drop until it hits the minimum value "X" 300. As at time $t_1$, since only engine 155 power is the sufficient energy available at time $t_7$, magnetic clutch controller 140 only keeps magnetic clutch 145 engaged until refrigerant pressure rises to intermediate pressure value "Y" 320 at time $t_8$. This cycle can thus continue indefinitely. In particular the presence of battery power in this case can further minimize the use of engine 155 to power the air conditioning system. Accordingly, FIG. 3B illustrates how a dual-source air conditioning system in accordance with implementations of the present invention can operate for lengthy periods of time (i.e., at least from time $t_2$ through $t_7$) without needing to engage engine 155 in an active state (i.e., accelerating or at constant speed).

As previously mentioned, one will appreciate that these principles described with respect to FIGS. 3A and 3B can also be applied to charge other components with waste energy in response to one or more values (e.g., battery/brake pressure, battery charge, or the like) values. For example, in addition to pressurizing refrigerant, one or more components can be set to drive air brake compression (e.g., in a truck) based primarily on waste energy. In particular, one or more components can be configured to engage compression of the air brakes any time waste energy (e.g., deceleration) is detected, and up to one or more maximum pressure values (e.g., system design limits). The one or more components can also be configured to pressurize the air brakes with engine power only when the air brake pressure drops to a prescribed minimum value. As such, this functionality for compressing air brakes with waste energy can mirror, in at least some implementations, what is already described herein for operating compressor 110 and/or re-charging a vehicle battery (e.g., 180) with waste energy.

Figure 4:
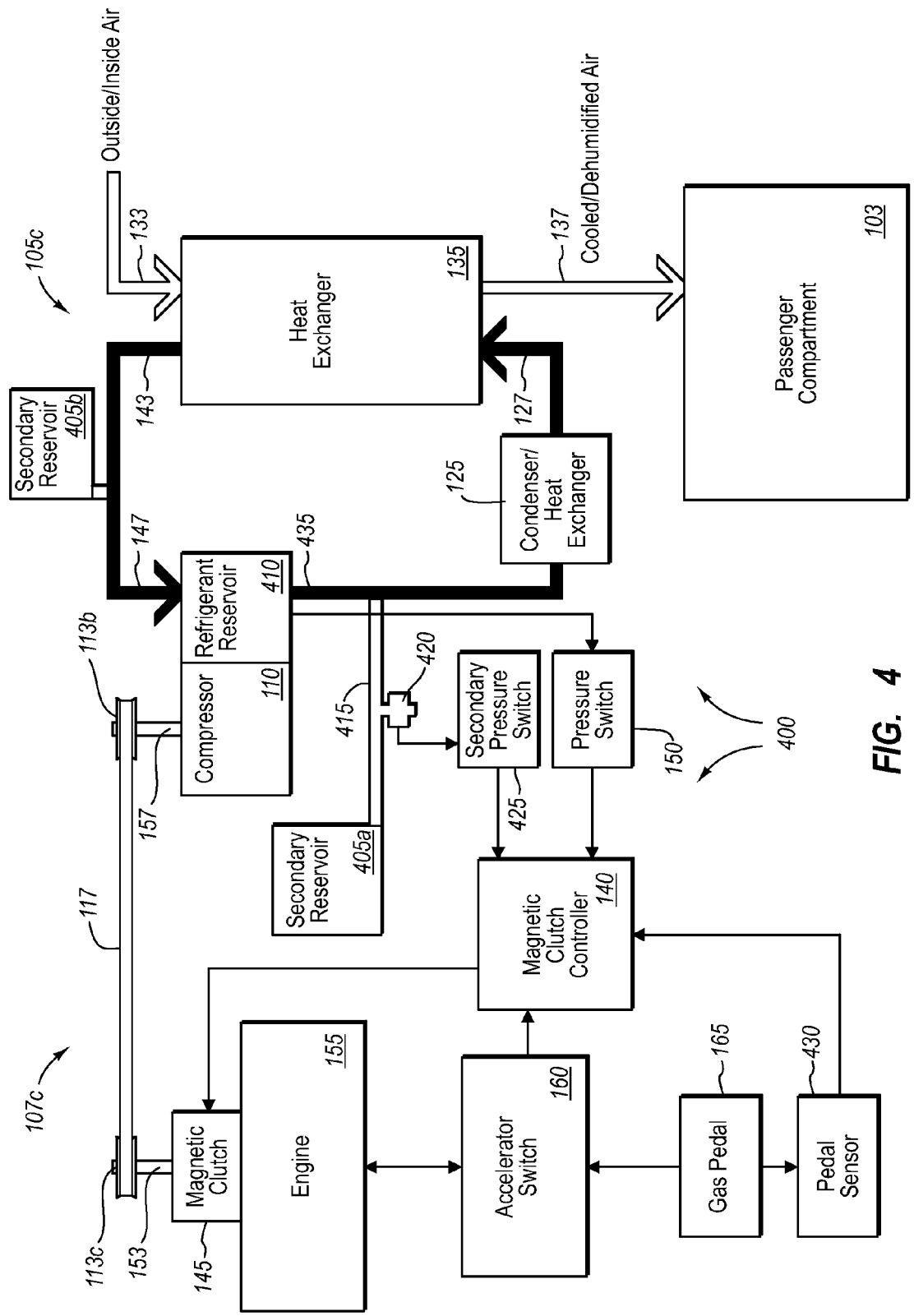
FIG. 4 illustrates a schematic overview of one or more components that can be used to retrofit a conventional vehicle's air conditioning system to operate principally on waste energy sources in accordance with an implementation of the present invention.

FIG. 4 illustrates a schematic diagram of air conditioning system 400, which includes a number of components to retrofit an existing vehicle air conditioning system to primarily utilize waste energy, as discussed herein. As shown, air conditioning system 400 includes refrigeration means 105*c*, which comprises compressor 110, refrigerant reservoir 410, and secondary reservoirs 405*a* and 405*b*. In one implementation, refrigerant reservoir 410 comprises the primary refrigerant reservoir of a standard air conditioning system, and can further include both a low pressure side reservoir and a high pressure side reservoir (or only a high pressure side reservoir). By contrast, either or both of secondary reservoirs 405*a/b* (see also FIG. 5B) can be retrofit onto existing system components to provide additional refrigerant volume and to allow for desired operability of air conditioning system 400. For example, existing reservoir 410 can be used as a high pressure reservoir, while reservoir 405*b* can be used as a low pressure reservoir. Similarly, reservoir 405*a* can be configured as a high pressure reservoir, while reservoir 410 is used to accept and store low pressure refrigerant.

In any event, secondary reservoirs 405*a* and/or 405*b* can be configured to serve at least one function of adding the to the total volume of refrigerant in the system. To this end, reservoirs 405*a* and/or 405*b* can be further configured with a Schrader valve fitting (e.g., nipple/stem), compression hose, or other system components for easily hooking up to (and/or disconnecting from) current air conditioning systems (e.g., without system evacuation) and also for receiving additional refrigerant. One will appreciate that the added refrigerant volume can increase the amount of time air conditioning system 400 (or 100*a/b*) can use to pressurize refrigerant with only waste energy (e.g., increase the value of $t_7-t_3$, FIG. 3B). Similarly, the added refrigerant volume can increase the amount of time air conditioning system 400 (or 100*a/b*) can operate without engine 155 power (e.g. increase the value of $t_7-t_2$, FIG. 3B). In particular, the added refrigerant volume can increase the amount of time refrigerant can be used in heat exchanger 135 without re-pressurization before it drops to a minimum pressure (e.g., "Z" 300), and thus needs re-compression (with whatever mode/source is available).

FIG. 4 also shows that air conditioning system 400 can include secondary pressure switch 425 (see also FIG. 5A), which can provide additional information to magnetic clutch controller 140, such as may not otherwise be provided by pressure switch 150. In particular, one will appreciate that using multiple pressure switches can, in at least some implementations, refine the accuracy by which magnetic clutch controller identifies whether certain pressure thresholds have been met. Accordingly, FIG. 4 shows at least one implementation in which pressure switch 425 is connected to Schrader valve 420, which, in turn, is connected to secondary reservoir 405*a*; while pressure switch 150 is connected to reservoir 410.

Of course, these pressure switch assignments can be varied, such that secondary pressure switch 425 (or pressure switch 150) is alternatively connected to secondary reservoir 405*b*, and so forth. In one implementation, for example, secondary pressure switch 425 is configured to identify when the high pressure side (i.e., 415, 435, 127) has dropped to or below a minimum pressurization value, while pressure switch 150 is configured to determine when the low pressure side (i.e., 143, 147) is too high. In another implementation, the pressure switch (150, 425, etc.) ensures that occurrences of vehicle waste energy will operate compressor 110 at all times, unless the refrigerant pressure is at it highest allowable pressurization state (i.e., the "maximum pressurization value).

In addition, FIG. 4 shows that air conditioning system 400 can include compression driving means 107*c*, which comprises at least magnetic clutch controller 140 configured to engage magnetic clutch 145. In contrast with FIGS. 1A-B, however, magnetic clutch 145 in this example is coupled to axle 153, rather than to axle 157. Furthermore, in addition to being connected to accelerator switch 160, FIG. 4 shows that compression driving means 107*c* includes pedal sensor 430 connected to magnetic clutch controller 140. In one implementation, pedal sensor 430 provides a direct indication regarding gas pedal depression (or lack thereof), and thus whether engine 155 is accelerating or decelerating. Pedal sensor 430 can be configured to operate in conjunction with (or in lieu of) accelerator switch 160. For example, it may be easier to install pedal sensor 430 in some vehicles than to install or access accelerator switch 160. In either case, pedal sensor 430 can be included as an after-market retrofit component.

Accordingly, implementations of the present invention include after-market kits for upgrading conventional vehicle existing air conditioning systems to create waste energy-operated air conditioning system 400. In one implementation, for example, such an after-market kit can comprise compression driving means components and refrigeration means components sufficiently configured for any make or model of vehicle to utilize waste energy as the principle mode of refrigerant compression. In at least one implementation, for example, this after-market kit can include one or more secondary reservoirs 405*a* and/or 405*b* (e.g., FIG. 5B) to increase the available volume of refrigerant, as well as secondary pressure switch 425 (e.g., FIG. 5A).

This after-market kit can also include pedal sensor 430, as well as a circuit board having electronic control circuitry, such as illustrated in FIG. 2A or 2B. For example, the after-market kit can include a secondary magnetic clutch controller (e.g., 140), which has circuitry as illustrated in FIG. 2A. Alternatively, the after-market kit can include circuitry that simply appends and adds to existing circuitry in an existing magnetic clutch controller, such as the electronic circuitry illustrated in FIG. 2B.

Similarly, this after-market kit can include replacement or appending microprocessors and sufficient memory for storing computer-executable instructions that cause compression to be coupled with the detection of waste energy (or battery power) signals. The after-market kit can still further include any pulleys, belts, and clutches that may be needed to couple existing compressor 110 to any of the engine fan axle, and/or to the vehicle's drive shaft or transmission shaft. Yet still further, this after-market kit can include self-charging motor 175 for dual-source configurations, as well as an additional battery in some cases. One will appreciate, therefore, that the number, type, or configuration of these and other necessary components can vary from vehicle to vehicle, as well as in accordance with the types of features a manufacturer may desire to provide.

Figure 5B:
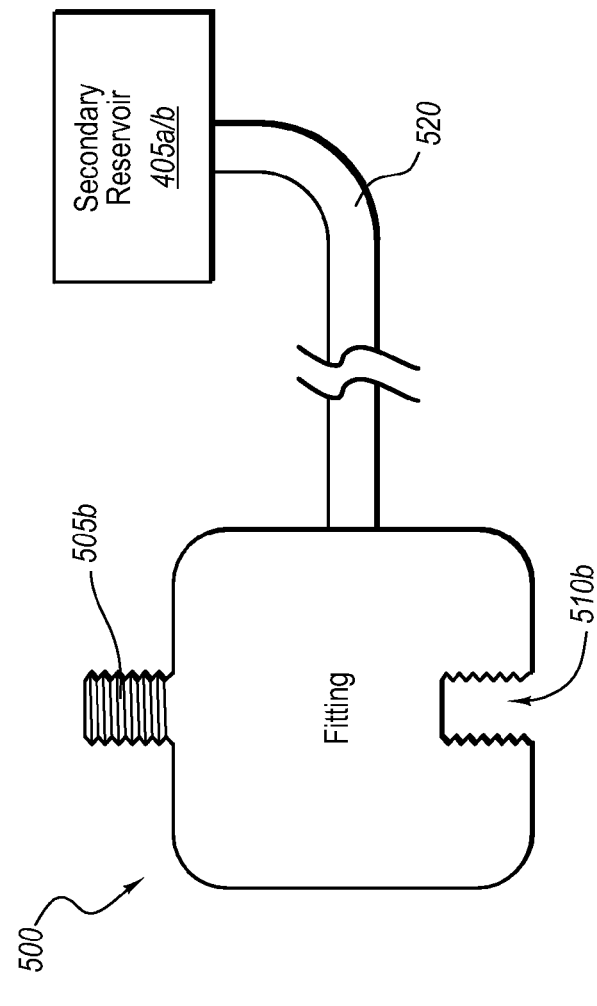
FIG. 5B illustrates a schematic diagram of one or more after-market components in accordance with an implementation of the present invention configured to add an additional refrigerant reservoir, such as illustrated in FIG. 4, to a vehicle's existing air conditioning system.
Figure 5A:
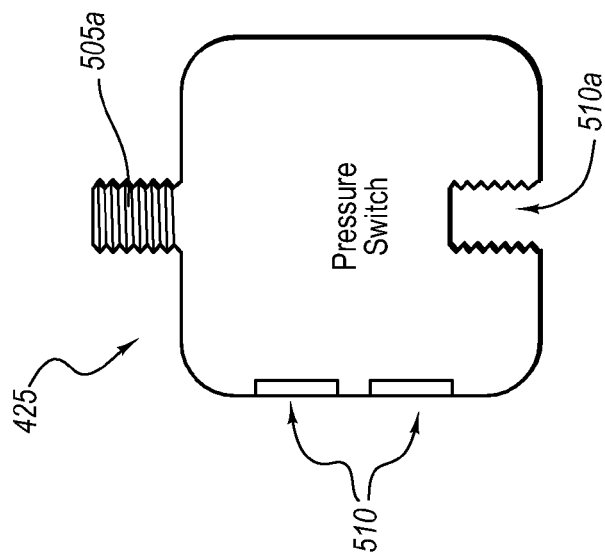
FIG. 5A illustrates schematic diagram of an after-market refrigerant pressure switch in accordance with an implementation of the present invention that is configured to be easily added to a vehicle's existing air conditioning system.

With respect to these or other types of the after-market kits described herein, FIG. 5A illustrates a schematic diagram of one implementation of a pressure switch (e.g., 425) that can be added to an air conditioning system (e.g., 400). In particular, FIG. 5A shows that pressure switch 425 can comprise a Schrader valve stem 505a, as well as a Schrader valve receptacle 510a. One will appreciate, however, that pressure switch 425 can include other types of connectors or interfaces, as appropriate for a particular vehicle. In any event, stem 510a can be configured to screw onto an existing refrigerant Schrader valve stem in an existing air conditioning system.

This allows the pressure switch to tap directly into, for example, an existing refrigerant reservoir, tubing, or the like on the low or high pressure sides of refrigeration means 105a-c. Pressure switch 425 can then pass electronic information (e.g., on/off, or specific pressure data) via electrical contacts 510, which can be electrically coupled ultimately to magnetic clutch controller 140. In one implementation, pressure switch 505a can further be coupled to one or more secondary refrigerant reservoirs (e.g., 405a/b), as appropriate.

For example, FIG. 5B illustrates a configuration of a generic coupling component 500 (i.e., "fitting 500"), which is configured to couple a component, such as refrigerant reservoir 405a/b directly into an existing air conditioning system (e.g., 400). Fitting 500 can be configured as pressure switch 425 in some cases, but can also simply be a retrofit coupling component without any additional functionality (e.g., pressure detection). In any event, FIG. 5A shows that coupling component 500 comprises a refrigerant Schrader valve receptacle 510b, as well as a Schrader valve stem 505b. Of course, any other type of interface may be appropriate for other types of vehicles and air conditioning system configurations. In addition, FIG. 5B further shows that fitting 500 can also be coupled via one or more links (e.g., refrigerant hoses, coils, etc.) to a secondary reservoir, such as reservoir 405a/b.

In one implementation, therefore, an after-market kit manufacturer can include at least pressure switch 425, any number of fittings 515, fluid connectors/links 520, reservoirs 405a/b, and additional refrigerant. A user can then couple at least pressure switch 425 directly to one or more Schrader fittings in an existing system, such as on the high or low pressure side of air conditioning system 400. The user can then electrically couple contacts 510 to a clutch controller (or other appropriate controller), such as magnetic clutch controller 140. The user can also attach additional reservoirs by attaching fitting 500 to one or more other Schrader fittings on the high or low pressure side of air conditioning system 400. The user can then attach one or more secondary reservoirs 405a/b to fitting 500 via any number of fluid connectors/links 520.

Accordingly, FIGS. 1A-5B, and the corresponding text, illustrate or describe a number of components and configurations that can be used to drive refrigerant compression primarily with passive, or waste, energy sources in both single and dual operation modes. In particular, these components and configurations can also be used to drive refrigerant compression independently from braking actions, since they can be activated with any detection of vehicle waste kinetic energy, rather than just waste kinetic energy during braking cycles.

In addition, FIGS. 1A-5B illustrate components, configurations, and functions that can be applied not only to a wide range of new vehicle designs, but also to relatively low cost (and relatively simple) after-market kits for retrofitting existing vehicle designs so that these vehicles can operate much more efficiently when using the air conditioning system. In particular, such kits can be made with components that a lay user with only a basic understanding of vehicle engines could readily install on the vehicle with minimal effort, and with minimal installation or maintenance expenditure(s). Furthermore, and due in part to the relative low cost of the components (as well as relatively low maintenance costs thereof), such kits can allow a user to thus significantly minimize fuel efficiency losses otherwise due to running an air conditioning system without significant cost or resource expenditure.

One will also appreciate, therefore, that a user or manufacturer can modify the components and functions described herein any number of ways within the spirit and scope of the present invention. For example, pressure switch 150 can be positioned to detect the high pressure side of refrigeration means 105, rather than primarily or only the low pressure side. In addition, air conditioning system 100a (or 100b, 400) can be configured to identify pressure on either the low or high pressure sides with a combination of sensors, detectors and microprocessors rather than a specific "pressure switch." Similarly, magnetic clutch controller 140 can be configured to determine deceleration with a combination of sensors, detectors and microprocessors rather than a specific "accelerator switch."

In addition, air conditioning system 100a (or 100b, 400) can be configured to draw power from engine 155 using mechanisms and components other than a magnetic clutch and pulley system (e.g., pulleys 113a-b, notched belt 117). In addition, or in alternative thereto, air conditioning system 100a (or 100b, 400) can be configured to draw power from engine 155 without necessarily be coupled directly to engine 155 (e.g., via an engine fan). Furthermore, the air conditioning system can include a single sensor in place of pressure switch 150, where the single sensor primarily controls magnetic clutch 145.

With respect to the electronic circuitry illustrated in FIGS. 2A-2B, thermal shut-off switch 230 can be positioned so that it opens only when engine 155 is accelerating. In another or alternative implementation, non-switch sensors other than switches 150, 160, 215, 230, or 240 can be used to indicate refrigerant pressurization and/or acceleration/deceleration modes. Similarly, switches 150, 160, 215, 230, or 240 can comprise any type of dynamic sensor, such as digital or analog sensors, or other types of detection components.

As also mentioned throughout this description, the functions of any of the above-describe switches can be accomplished in some cases with one or more microprocessors and computer-executable software instructions configured to send engagement and/or disengagement signals in response to detected pressure or temperature values. For example, and with particular respect to computer-executable instructions, implementations of the present invention can also comprise a special purpose or general-purpose computerized components. Such computerized components can be configured to store, send, and/or execute instructions or data structures stored in the form of computer-readable media. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A vehicle air conditioning system configured to compress refrigerant with mechanical waste energy from vehicle deceleration, comprising:
    refrigeration means including at least a compressor configured to pressurize refrigerant;
    compression driving means configured to drive the refrigeration means at least in part upon detecting mechanical waste energy, such that compressor operation coincides with, and is operated by, the detected mechanical waste energy; and
    one or more pressure detectors configured to identify a maximum refrigerant pressure for the system pressure and a minimum refrigerant pressure for the system;
    wherein the compression driving means are configured to engage operation of the compressor any time;
    (i) the mechanical waster energy is detected; and
    (ii) the refrigerant pressure is below the maximum refrigerant pressure for the system.

2. The vehicle air conditioning system as recited in claim 1, wherein any of the one or more pressure detectors are further configured to identify an intermediate pressure value.

3. The vehicle air conditioning system as recited in claim 2, wherein the compression driving means are further configured to disengage operation of the compressor at the intermediate pressure value upon detecting that mechanical waste energy or sufficient battery power is unavailable.

4. The vehicle air conditioning system as recited in claim 1, wherein the compression driving means are coupled only indirectly to an engine block via direct coupling to one of a vehicle drive shaft or a transmission shaft.

5. A dual-source vehicle air conditioning system configured to operate on a vehicle's mechanical waste energy for an extended period of time before engaging active engine power to compress refrigerant, comprising:
    one or more electronic switches configured to respond to engine acceleration or deceleration of a vehicle;
    a refrigerant compressor;
    a self-charging motor; and
    one or more engagement components configured to couple the compressor and the self-charging motor with mechanical waste energy in response to a change in the one or more switches.

6. The dual-source vehicle air conditioning system as recited in claim 5, wherein the one or more engagement components are selectively coupled to one or more vehicle axles that rotate with vehicle motion.

7. The dual-source vehicle air conditioning system as recited in claim 6, wherein the one or more engagement components comprise a magnetic clutch controller and a magnetic clutch.

8. The dual-source vehicle air conditioning system as recited in claim 7, wherein the magnetic clutch controller is configured to engage the magnetic clutch to one of the one or more vehicle axles in concert with engine deceleration.

9. The dual-source vehicle air conditioning system as recited in claim 5, wherein coupling the compressor to the mechanical waste energy charges a battery.

10. The dual-source vehicle air conditioning system as recited in claim 9, further comprising one or more electronic components configured to detect a minimum pressure value, an intermediate pressure value, and a maximum pressure value of the refrigerant.

11. The dual-source vehicle air conditioning system as recited in claim 10, wherein the one or more engagement components are configured to power the refrigerant compressor with the battery upon identifying:
    (i) a pressure below at or below the minimum pressure value; and
    (ii) no available mechanical waste energy.

12. The dual-source vehicle air conditioning system as recited in claim 11, wherein the one or more engagement components are configured to stop powering the refrigerant compressor upon identifying that the refrigerant is at the maximum design pressure value.

13. In a vehicle air conditioning system, a method of compressing refrigerant with minimal engine load by compressing the refrigerant primarily with vehicle waste energy, comprising the acts of:
    identifying that the vehicle's engine is decelerating;
    powering a refrigerant compressor and a self-charging motor with a rotating axle, such that refrigerant is compressed and a battery is charged with mechanical waste energy during deceleration; and
    compressing the refrigerant in a refrigerant compressor with the rotating axle, or with battery power, upon identifying that the refrigerant has reached a minimum pressure value.

14. The method as recited in claim 13, further comprising an act of disengaging the rotating axle from the refrigerant compressor upon identifying that:
    (i) the engine is providing constant or acceleration speed-based power; and
    (ii) the refrigerant has reached an intermediate pressure value.

15. The method as recited in claim 13, further comprising an act of disengaging battery power upon identifying a new deceleration event for the vehicle.

16. The method as recited in claim 15, further comprising an act of disengaging the refrigerant compressor from the rotating axle or from the battery power, at least momentarily, upon identifying that the refrigerant has reached a maximum pressure value for the system.

17. The method as recited in claim 16, further comprising an act of re-engaging the battery power to power the refrigerant compressor upon identifying that the refrigerant has dropped below the maximum pressure value for the system.

18. A computer readable medium having computer-executable instructions stored thereon that, when executed, cause one or more components of a vehicle air conditioning system to perform the acts of the method recited in claim 13.

19. A vehicle air conditioning system configured to compress refrigerant with mechanical waste energy from vehicle deceleration, comprising:

refrigeration means including at least a compressor configured to pressurize refrigerant;

compression driving means configured to drive the refrigeration means at least in part upon detecting mechanical waste energy, such that compressor operation coincides with, and is operated by, the detected mechanical waste energy; and one or more pressure detectors configured to identify a maximum refrigerant pressure for the system pressure and a minimum refrigerant pressure for the system;

wherein:

(i) the one or more pressure detectors are further configured to identify an intermediate pressure value; and (ii) the compression driving means are further configured to disengage operation of the compressor at the intermediate pressure value upon detecting that mechanical waste energy or sufficient battery power is unavailable.

* * * * *

UNITED STATES PATENT AND TRADEMARK OFFICE
CERTIFICATE OF CORRECTION

PATENT NO. : 7,260,947 B1
APPLICATION NO. : 11/456199
DATED : August 28, 2007
INVENTOR(S) : Thomas D. Harrison It is certified that error appears in the above-identified patent and that said Letters Patent is hereby corrected as shown below:

Drawings
Sheet 3, replace FIG. 2B with the figure depicted herein below, wherein the reference "160" has been removed, and reference "250" has been changed to --160--

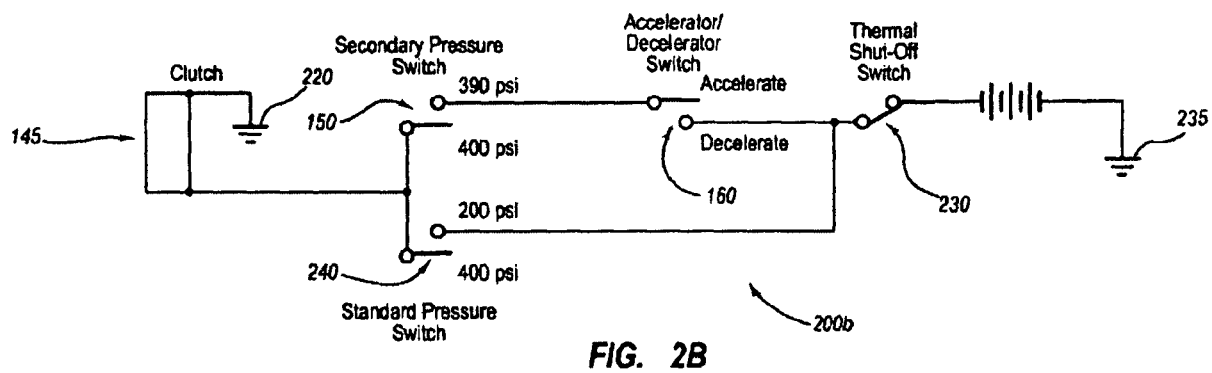

FIG. 2B

Column 4
Line 13, after "illustrates", insert --a--

Column 8
Line 2, change "105" to --105a--

Column 9
Line 17, change "Abe" to --be--

Column 11
Line 5, change "230a" to --230--

Column 15
Line 39, change "adding the to" to --adding the refrigerant to--

Column 17
Line 48, change "515" to --500--

Column 20
Line 37, after "pressure", remove [below]

Signed and Sealed this

Sixteenth Day of February, 2010

David J. Kappos
*Director of the United States Patent and Trademark Office*